United States Patent
Rogge et al.

[11] Patent Number: 5,669,302
[45] Date of Patent: Sep. 23, 1997

[54] MOUNTING DEVICE FOR BEARINGS PLACED ON SHAFT EXTENSIONS

[75] Inventors: Günter Rogge, Lienen; Werner Jost-Enneking, Lotte, both of Germany

[73] Assignee: Windmöller & Hölscher, Lengerich, Germany

[21] Appl. No.: 641,904

[22] Filed: May 2, 1996

[30] Foreign Application Priority Data

May 4, 1995 [DE] Germany ............... 195 16 455.5

[51] Int. Cl.$^6$ ............................................. B41F 5/00
[52] U.S. Cl. ................... 101/216; 101/348; 101/247; 101/174; 101/181
[58] Field of Search .................... 101/183, 216, 101/181, 182, 174, 175, 184, 185, 212, 219, 221, 247, 348, 352

[56] References Cited

U.S. PATENT DOCUMENTS

| | | | |
|---|---|---|---|
| 1,179,797 | 4/1916 | Bell | 101/348 |
| 4,413,560 | 11/1983 | Rogge | 101/247 |
| 4,528,907 | 7/1985 | Davison | 101/219 |
| 4,760,789 | 8/1988 | Witczak | 101/348 |
| 5,357,862 | 10/1994 | Kohara | 101/348 |

FOREIGN PATENT DOCUMENTS

| | | | |
|---|---|---|---|
| 0236897 | 4/1964 | Australia | 101/174 |
| 0438733B1 | 7/1991 | European Pat. Off. . | |
| 1 254 112 | 11/1967 | Germany . | |
| 0001942 | 12/1919 | United Kingdom | 101/348 |

*Primary Examiner*—Christopher A. Bennett
*Attorney, Agent, or Firm*—Keck, Mahin & Cate

[57] ABSTRACT

A mounting device for bearings placed on shaft extensions consists of a lower support basin rigidly connected with the frame and of a lid, connected in a pivoting manner with same, provided with a lower lever forming the operating portion which, when the lid is in the open position, extends into or across the support basin far enough to pivot the lid into its closed position by lowering the bearing abutting against it and placed on the shaft extension; in which closed position the basin rests tightly against the bearing with its circular, curved inner side. For the sake of simplification, a single lid is provided in a pivoting manner with a locking lever, which has at its end a hook portion, which engages an abutment of the support basin. Furthermore, an arrangement is provided which automatically pivots the locking lever.

6 Claims, 4 Drawing Sheets

5,669,302

MOUNTING DEVICE FOR BEARINGS PLACED ON SHAFT EXTENSIONS

FIELD OF THE INVENTION

The invention relates to a mounting device for bearings placed on shaft extensions, preferably for bearings of printing and inking rollers of printing machines, consisting of a lower support basin which is a rigid part of the frame and of a lid connected in a pivoting manner with same and provided with a lever forming an operating element which, when the lid is in the open position, extends into or across the support basin far enough so that it pivots the lid into its closed position by lowering the bearing abutting against it and placed on the shaft extension; the basin rests tightly against the bearing with its circular, curved inner side and can be locked in its closed position extended onto the bearing lying in the support basin.

BACKGROUND OF THE INVENTION

From EP 0 438 733 B1, a mounting device is known which makes it possible to place shaft extensions into and lift them out of mounting devices of bearings with bearings placed onto same through automated arrangements without requiring manual work for the opening and closing of the mounting devices. However, this known mounting device is relatively expensive since at the support basin two lids are mounted in a pivoting manner which, when they are extended to the closed position, rest against each other's front side and which are provided with a locking device connecting them.

SUMMARY OF THE INVENTION

It is the task of the invention to create a simpler mounting device of the initially mentioned type.

In accordance with the invention, this task is solved in that a single lid is provided in a pivoting manner with a locking lever which has at its end a hook-like portion with engages an abutment of the support basin and in that a device is provided which automatically pivots the locking lever. The mounting device of the invention distinguishes itself through a simple construction since it has only one single foldable lid whose free end can be locked simply and rapidly for the purpose of fixing the bearing to the support basin.

Advantageously, the device which automatically pivots the locking lever consists of a pressure spring forcing same in the closing direction, which spring can be pressed into its open position by means of a driven striker or the like. The pressure spring may consist of cup springs. By packing cup springs, a high pressure can be produced, even if the height of the spring is only slight.

According to a preferred embodiment, it is provided that the driven striker is the piston rod of a pneumatic cylinder.

The abutment may consist of a bolt of the support basin which can be gripped from behind. The hook-like part preferably has a flank, slanted in wedge-like form, which grips the abutment under tension. In this way, a mounting device with no play for the bearing is assured.

BRIEF DESCRIPTION OF THE DRAWINGS

An example of the invention is explained in greater detail in the following text by means of the figures, wherein.

DETAILED DESCRIPTION OF THE PREFERRED EMBODIMENTS

Figure 1:
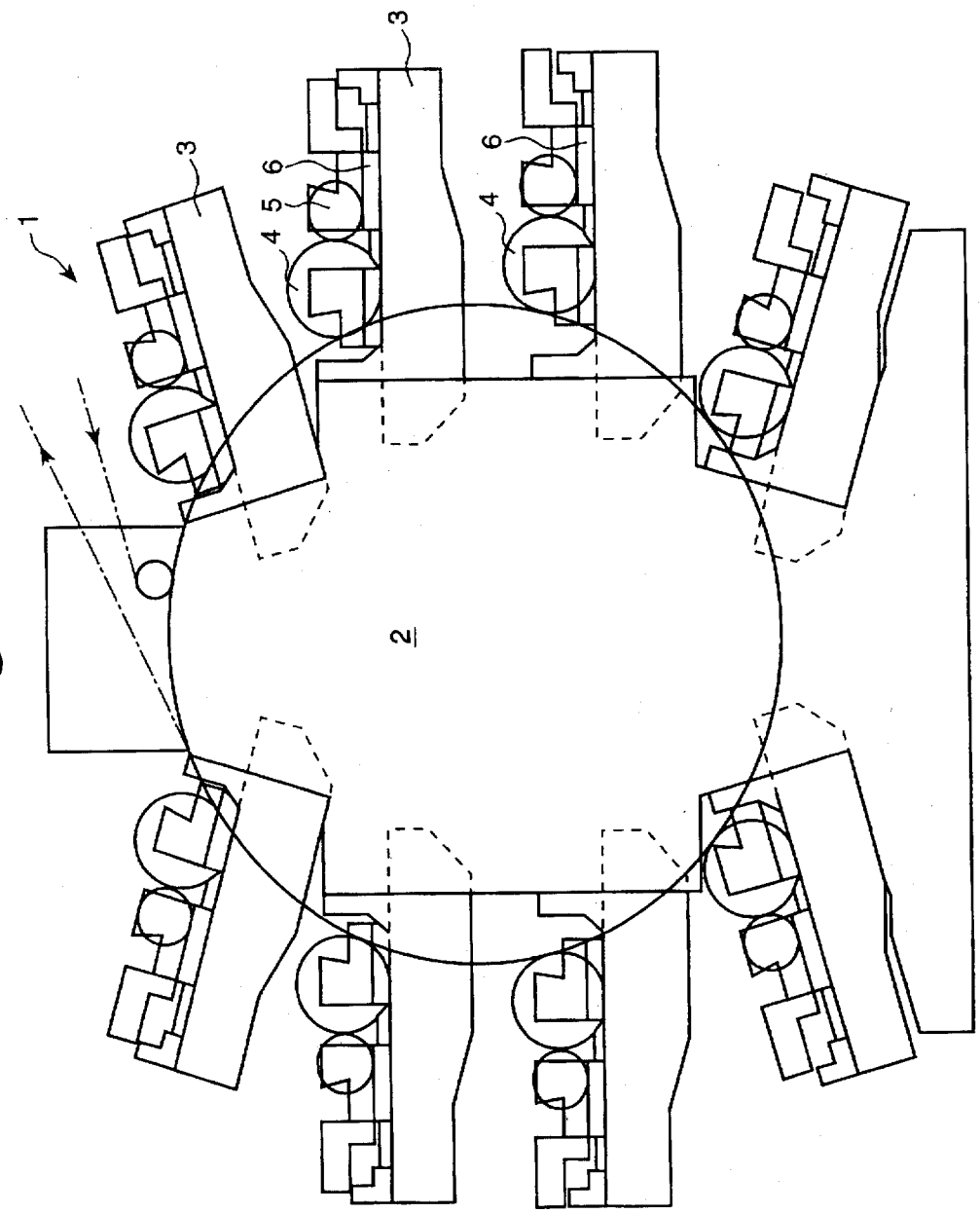
FIG. 1 shows a schematic side view of a flexographic printing machine.

A flexographic printing machine (1) is provided with a central counterpressure cylinder (2) to which the printing rollers (4) of all printing groups can be linked. The impression cylinders (4) and the screen rollers (5), which can be linked to same, are mounted in bearing blocks which can be slid onto printing group consoles (3) connected with the frame. Flexographic printing machines of this type are known, for example, from DE-C-29 41 521 and from EP-B-O 438 733.

Figure 2:
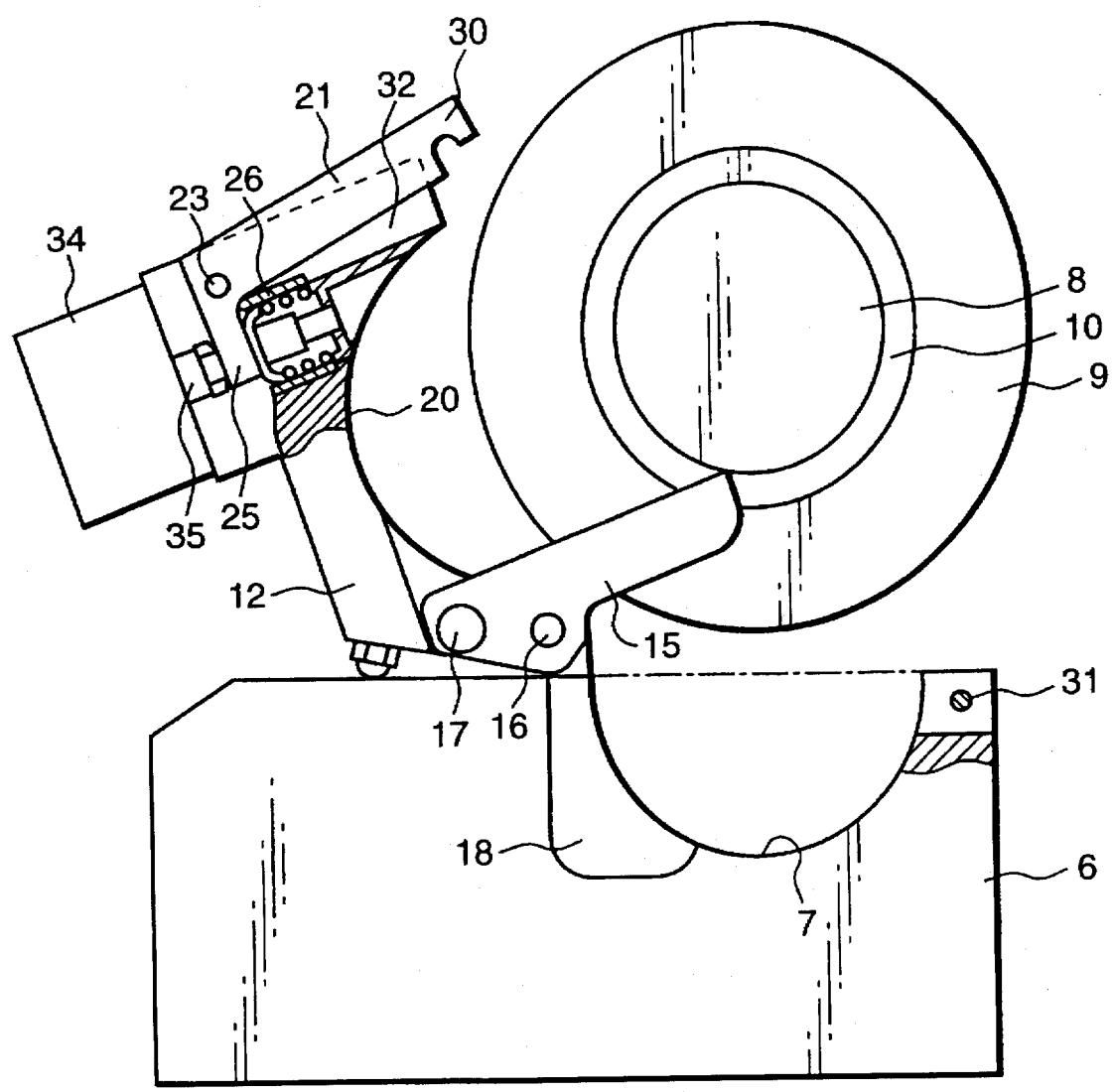
FIG. 2 shows a side view of the bearing block of a screen roller with the mounting device for the bearing in its open position.

As can be seen from FIG. 2, each screen roller bearing block (6) is provided with a support basin (7) which has an approximately semicylindrical wall. Into this support basin (7) the bearing (10), which has been placed on the shaft extension (8) of the screen roller (9), can be placed, which bearing may be an antifriction bearing the outer diameter of which corresponds to the radius of curvature of the wall of the support basin (7).

Figure 3:
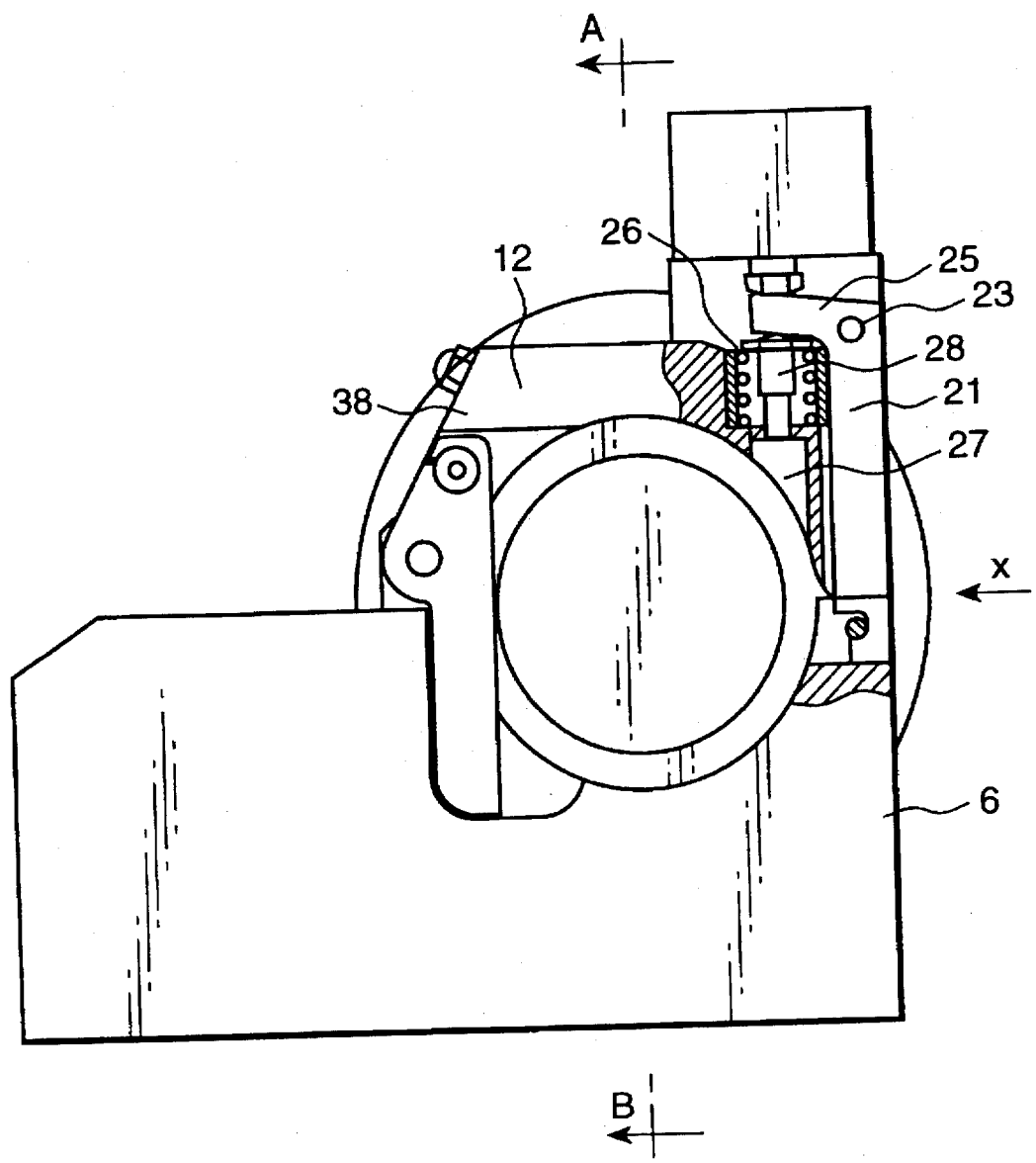
FIG. 3 shows the bearing block in accordance with FIG. 2 with the mounting device for the bearing in its closed position.
Figure 4:
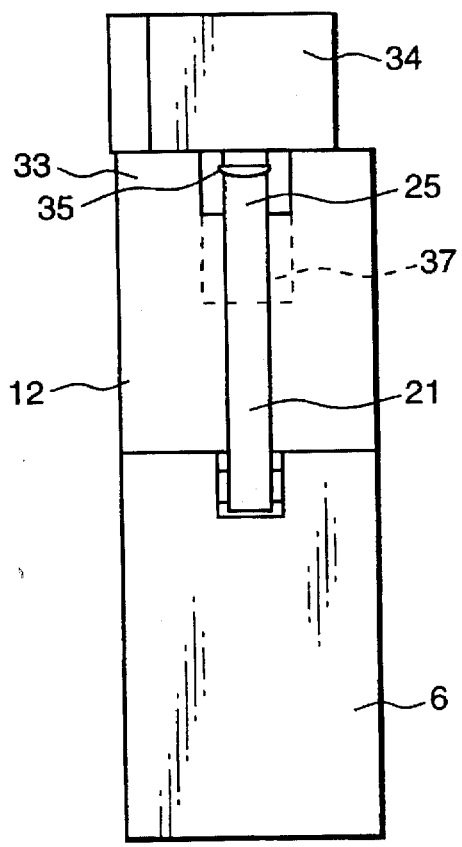
FIG. 4 shows a view of the bearing block in the direction of arrow X in FIG. 3.
Figure 5:
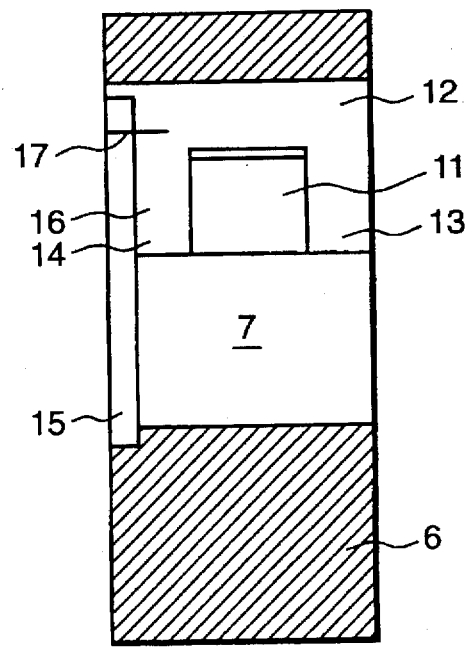
FIG. 5 shows a cross-section through the bearing block along the line A–B in FIG. 3.

On the left side of the support basin (7), the screen roller bearing block (6) has a bearing block (11) for the lid (12). The lid (12) is provided with bifurcated bearing flanges (13, 14), wherein the bearing flanges and the bearing block (11) are provided with aligned bore holes in which a bearing block is mounted or arranged. The lid (12) is connected laterally with a lever (15) which, in the manner shown in FIGS. 2, 3 and 5, is located in a lateral recess of the lid. The lever (15) is provided with a bore hole with which it grips the bearing pin (16). Additionally, it is screwed to the lid by means of a screw bolt (17). Also the screen roller bearing block (6) is provided with a lateral recess (18) into which the lever (15) can freely dip after the bearing (10) has been lowered into the support basin (7).

The lid is provided on its underside with a recess (20) in the form of a cylindrical basin, the radius of curvature of which corresponds to the diameter of the bearing (10).

In a groove or between bifurcated flanges of the free end of the lid, a locking lever (21) is mounted in a pivoting manner. For the mounting of the locking lever (21), bore holes are provided which penetrate the flanks of the groove (32) in which the bearing pin (23) mounting the lever (21) is located. The lever (21) is in the form of an angle lever, wherein the shorter angular flange (25) extends beyond a bore of the lid (12). Into the bore hole (37), a cup spring packet (26) is placed, the lower cup spring of which is supported on an annular step of the bore hole (37). The bore holes of the cup springs are penetrated by a pin (28) provided with a head, that widens upward, wherein the upper cup spring is supported on the annular step formed by the head. In the manner shown in FIGS. 2 and 3, the head of the pin (28) is supported on the lower flank of the shorter lever (25), so that the cup spring packet (26) tends to pivot the lever (21) into the closed position seen in FIG. 3.

The lever (21) is provided on its free lower end with a hook-like portion (30), which in the locked position shown in FIG. 3, grips behind a pin (31) mounted in a groove of the screen roller bearing block (6) and forming an abutment.

Onto the lid (12), a mounting (33) for a pneumatic cylinder (34) is placed, the piston rod (35) of which is supported on the shorter lever arm (25) of the locking lever (21). If the pneumatic cylinder (34) is subjected to pressure, the piston rod (35) swings out and pivots the locking lever (21) against the force of the cup spring packet (26) into the unlocked position seen in FIG. 2.

In the position seen in FIG. 3, the pneumatic cylinder (34) is without pressure, so that the locking lever (21) is held in its locked position by the cup spring packet (26) alone.

The lid (12) is provided with a stop (38) with which it can support itself in the open position seen in FIG. 2 on the screen roller bearing block (6).

What is claimed is:

1. A mounting device for bearings placed on shaft extensions of printing and inking rollers of printing machines, comprising:

a frame, a lower support basin forming a rigid part of the frame and having a curved inner side, a single lid connected the lower support basin and pivoting relative to said lower support basin between an open position and a closed position, a lever on the lid forming an operating element which, when the lid is in the open position, extends at least partly across the lower support basin and which pivots the lid into the closed position by lowering one of the bearings placed on one of the shaft extensions and abutting against the lever, the curved inner side of the basin resting tightly against the one of the bearings when said lid is in the closed position, a locking lever provided in a pivoting manner on said single lid, a hook portion provided on an end of said locking lever, an abutment defined on the support basin with which said hook portion hooks, and a device which automatically pivots the locking lever.

2. A mounting device in accordance with claim 1, wherein the device which automatically pivots the locking lever comprises a compression spring forcing the locking lever in a closing direction, and a driven striker which can press the locking lever in an opening direction.

3. A mounting device in accordance with claim 2, wherein the compression spring comprises a cup spring packet.

4. A mounting device in accordance with claim 2, wherein the driven striker is a piston rod of a pneumatic cylinder.

5. A mounting device in accordance with claim 1, wherein the abutment comprises a bolt secured to the support basin.

6. A mounting device in accordance with claim 1, wherein the hook portion has a flank which engages the abutment under tension.

* * * * *